United States Patent
Hägebarth

(10) Patent No.: US 6,687,505 B1
(45) Date of Patent: Feb. 3, 2004

(54) METHOD OF MONITORING THE POSITION OF A MOBILE SUBSCRIBER AS WELL AS IN SERVER AND WEB SERVER FOR CARRYING OUT THE METHOD

(75) Inventor: Frank Hägebarth, Kirchheim (DE)

(73) Assignee: Alcatel, Paris (FR)

( * ) Notice: Subject to any disclaimer, the term of this patent is extended or adjusted under 35 U.S.C. 154(b) by 526 days.

(21) Appl. No.: 09/612,249

(22) Filed: Jul. 7, 2000

(30) Foreign Application Priority Data

Jul. 14, 1999 (DE) .......................... 199 32 737

(51) Int. Cl.⁷ ................................ H04Q 7/20
(52) U.S. Cl. ................ 455/456.2; 455/456.7; 455/456.3; 455/457; 455/414.2
(58) Field of Search ............... 455/456.2, 457, 455/414, 435, 461, 456.1, 456.3, 414.2

(56) References Cited

U.S. PATENT DOCUMENTS

| | | | |
|---|---|---|---|
| 6,202,023 B1 * | 3/2001 | Hancock et al. | 701/201 |
| 6,453,162 B1 * | 9/2002 | Gentry | 455/433 |
| 6,477,374 B1 * | 11/2002 | Shaffer et al. | 455/445 |

FOREIGN PATENT DOCUMENTS

| | | | |
|---|---|---|---|
| DE | 3816377 A1 | 11/1989 | |
| DE | 43 16 091 A1 | 11/1994 | |
| DE | 44 23 328 A1 | 1/1996 | |
| DE | 198 24 587 A1 | 12/1998 | |
| DE | 197 55 891 A1 | 6/1999 | |
| EP | 0 887 782 A2 | 12/1998 | |
| FR | 2 761 837 A1 | 10/1998 | |
| JP | 093 19 303 | 12/1997 | |
| JP | 101 03 986 | 1/1998 | |
| JP | 100 38 591 | 2/1998 | |
| JP | 102 60 047 | 9/1998 | |
| JP | 110 85 011 | 3/1999 | |
| WO | WO 9724010 A1 * | 7/1997 | H04Q/7/38 |
| WO | WO 98/00988 | 1/1998 | |
| WO | WO 98/51104 | 11/1998 | |

* cited by examiner

Primary Examiner—William Trost
Assistant Examiner—Sharad Rampuria
(74) Attorney, Agent, or Firm—Sughrue Mion, PLLC

(57) ABSTRACT

A method of monitoring the position of a mobile subscriber is disclosed in which the position data of the cell in which the mobile subscriber is currently located are passed through an IN (intelligent network) server (2) to a Web server (4) of the Internet, edited there, and presented on a Web page (5).

5 Claims, 1 Drawing Sheet

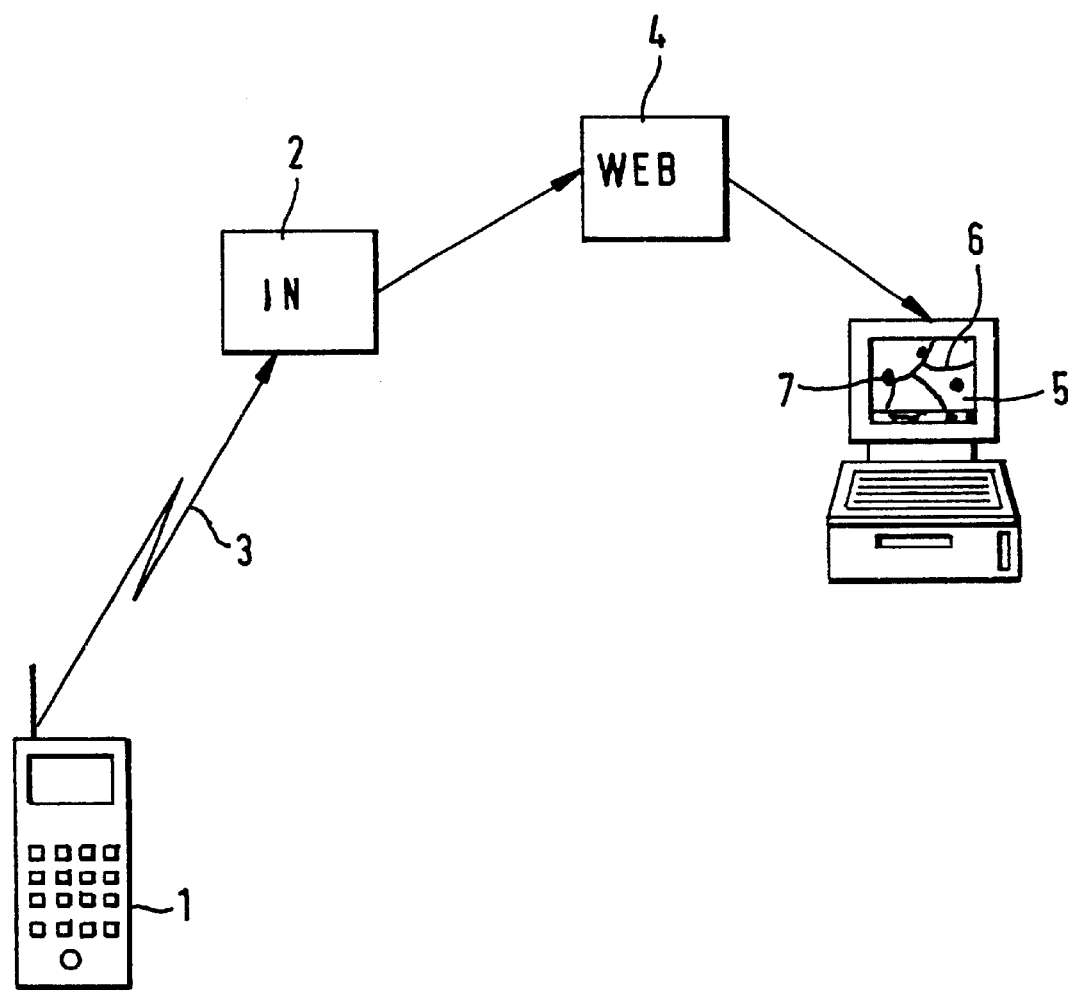

METHOD OF MONITORING THE POSITION OF A MOBILE SUBSCRIBER AS WELL AS IN SERVER AND WEB SERVER FOR CARRYING OUT THE METHOD

This invention relates to a method of monitoring the position of a mobile subscriber. For forwarding agencies and other mobile services enterprises, it is of great importance to be able to determine and keep track of the positions of their vehicles and the locations of their field personnel. This has resulted in the development of tracking systems. The mobile segment of such systems consists essentially of two components. By means of a GPS receiver (GPS=Global Position System), the current position is determined using satellites. A radio system ensures the transmission of the position data to a center from which the vehicle positions are monitored. Disadvantages of these systems are their high cost as well as the size and weight of the equipment. Such tracking equipment is only of benefit to large forwarding agencies. For private applications, for instance in a private vehicle, the tracking equipment is much too expensive. Because of the size and weight of the equipment, its use outside a vehicle, and thus tracking of persons outside a vehicle, is not possible.

It is the object of the invention to eliminate the above disadvantages and provide a method which permits extremely low-cost tracking of vehicles or persons with low accuracy requirements.

This object is attained by the features of claim 1. One component of the mobile radio network determines in which cell of the network a particular mobile subscriber is currently located. This is an elementary function of any mobile radio network. It only requires that the respective terminal has been turned on and that a network connection exists. The position data of the cell are presented on a Web page of the Internet by means of an IN (intelligent network) server and a Web server. The position data may, for instance, be the center coordinates of the cell. The tracking accuracy, i.e., the resolution of the tracking, depends on the size of the cells. In rural or sparsely populated areas, the cells of a cellular system are usually larger than in conurbations. Therefore, the resolution in conurbations and big cities is correspondingly higher. Particularly in conurbations, because of increased subscriber densities, a reduction in cell size toward microcells is to be expected for the future. Therefore, in such areas, the resolution of the "on-line mobile radio tracking" claimed will continue to increase. This tracking method represents an additional attractive service feature for mobile radio networks. An extremely simple and low-cost tracking method is made available which is suited even for private applications. The tracking accuracy should be quite sufficient for many applications.

A preferred embodiment characterized in claim 2 is based on the graphical representation of the position data on the background of a map. The position data for a given period, for instance the last 24 hours, can then be represented by arrows that indicate the direction of movement.

According to claim 3, the display of the position data by the Web server is activated and deactivated by an IN call. This may require that the mobile subscriber has subscribed to a new "on-line mobile radio tracking" service, with only the mobile subscriber himself or an authorized person being capable of initiating the activation or deactivation by dialing a given sequence of digits (IN call).

According to claim 4, the circle of users of the Web page is limited. In this way, the information about the locations of the mobile subscribers is protected from misuse. The identification of the subscriber can be rendered more difficult by encrypting or completely omitting biographical data on the Web pages.

According to claim 5, the circle of users is limited by specifying an ID or a password. To retrieve the tracking information, the user calls a particular page in the Internet. This page can only be opened using the ID or the associated password. The ID and the password are preferably selected by the person to be monitored.

According to claim 6, the ID and the password are advantageously specified via the IN server. Preferably, the ID and the password can only be changed by the person to be monitored, namely by dialing a sequence of digits (IN call) known only to that person. In this way, in case of both private and official use, the circle of persons authorized to access the respective Web pages can be newly determined by informing only this circle of persons of the new ID and the new password. A staff member leaving a forwarding agency can thus be excluded from the circle of authorized persons in a simple manner.

An IN server for carrying out the method may have the features of claim 7. The IN server then acts as a relay station for passing the position data of the respective cell to the Web server. Direct transfer of the position data from the terminal of the mobile subscriber to the Web server is also possible, in which case the IN server only establishes a connection after an IN call and releases this connection after a further IN call.

According to claim 8, the IN server additionally includes activating/deactivating means which supply signals to the Web server. This measure allows the mobile subscriber to part from the tracking scheme and use his mobile terminal without his position being monitored. Such activation and deactivation can be dispensed with, however, if the mobile terminal is to be used as a tracking instrument at all times. That could be the case particularly with mobile terminals of forwarding agencies that are used exclusively for official purposes. The monitoring function then begins with the turning on of the mobile terminal and ends with its turnoff. The forwarding agency would then have control over whether the mobile terminal is used outside working hours for private purposes.

Furthermore, according to claim 9, the IN server can be used to define the circle of persons authorized to access the Web page.

According to claim 10, a Web server for carrying out the method using the IN server includes means for editing the position data and for selecting the Web page. It preferably has access to digitally stored road data and topography data which are retrieved based on the position data determined and which are presented on the Web page in a graphic on which the position data are superimposed, for example in the form of route points.

The invention will become more apparent by reference to the following description of an embodiment shown schematically in the accompanying drawing.

The single FIGURE of the drawing shows the essential components of a tracking system. A terminal 1 of a mobile subscriber is connectable via a radio link 3 to an IN server 2. IN server 2 feeds a Web server 4, which creates Web pages 5 as an Internet application. On Web page 5, roads 6 of a given area are displayed and the approximate position data of terminal 1 are presented in the form of route points 7. To accomplish this, the cell in which the mobile subscriber is currently located is evaluated. The data of these cells, which serve as position data to indicate the route points 7, are available in any mobile radio network for any mobile subscriber at any time. IN server 2 resorts to these data and transfers them to Web server 4. This provides a tracking method which does not require the installation of specific user equipment. It is only necessary for the person to be monitored to have a mobile terminal, while at the monitoring end, only an Internet access line is necessary. For data security reasons, access to Web page 5 is ID- and password-protected. The ID and the password can only be specified and changed by the mobile subscriber and/or by particular authorized persons via IN server 2. Signals for activating and deactivating the tracking are also advantageously transferred to Web server 4 via IN server 2.

The invention is not limited to the embodiment described. Various modifications may be made

What is claimed is:

1. A method of monitoring the position of a mobile subscriber, comprising the steps of:

routing the position data of the cell in which the mobile subscriber is currently located via an IN (intelligent network) server to an Internet Web server, editing said position data at said Web server, and presenting said position data on a Web page, wherein the IN server specifies an ID and password in order to access the Web page, wherein a mobile subscriber or an authorized person can change the ID and password by dialing a sequence of digits during an IN call to the IN server.

2. A method as claimed in claim 1, wherein the position data are presented as route points on the background of a map.

3. A method as claimed in claim 1, wherein the Web server is activated and deactivated by an IN call.

4. A method as claimed in claim 1, wherein the Web page is made accessible only to a specified circle of users.

5. A method as claimed in claim 4, wherein the mobile subscriber or the authorized person determines the circle of users by specifying an ID or a password.

* * * * *